United States Patent [19]

Oehler et al.

[11] Patent Number: 4,816,551
[45] Date of Patent: Mar. 28, 1989

[54] OIL BASED DRILLING FLUIDS

[75] Inventors: Harris A. Oehler, Houston; Henry C. McLaurine, Katy; Charles K. Grantham, Houston, all of Tex.

[73] Assignee: MI Drilling Fluids Company, Houston, Tex.

[21] Appl. No.: 28,423

[22] Filed: Mar. 20, 1987

Related U.S. Application Data

[63] Continuation-in-part of Ser. No. 799,530, Nov. 19, 1985, abandoned.

[51] Int. Cl.$^4$ .................. C08G 69/44; C08G 69/34
[52] U.S. Cl. .................. 528/295.3; 260/404.5; 528/291; 528/335; 528/342
[58] Field of Search .................. 528/295.3, 291, 339.3, 528/335, 342; 260/404.5 PA

[56] References Cited

U.S. PATENT DOCUMENTS 3,397,816 8/1986 Ess et al. .................. 528/295.3
4,343,743 8/1982 Coquard et al. .................. 528/295.3
4,569,985 2/1986 Frihart et al. .................. 528/295.3

Primary Examiner—Harold D. Anderson
Attorney, Agent, or Firm—Arnold, White & Durkee

[57] ABSTRACT

By the use of small amounts of novel amide resin reaction products of dibasic dimerized or trimerized fatty acids, an alkanolamine and a polyalkylene polyamine, improved drilling mud formulations are obtained. In those oil mud drilling formulations that contain organophilic clays, one is able to maximize the viscosity and gelation of the formulations, resulting in less preparation time and less material usage, especially the clay. In accordance with the invention, one is able to thicken or gel oil-mud systems at usual operating temperatures even when using low viscosity/low aromatic oils as the external phase, and to maximize the yield of organophilic clays readily in a short period of time, at low shear rates. The amide resin extends the utility of organophilic clays in low viscosity oil-mud systems. They produce more shear thinning fluids, higher yield points and quicker gel strengths while maintianing low plastic viscosities.

10 Claims, No Drawings

OIL BASED DRILLING FLUIDS

This is a continuation in part of application Ser. No. 799,530, filed 11/19/85, now abandoned.

BACKGROUND OF THE INVENTION

Circulating fluids are required in the rotary drilling of formations containing hydrocarbons. These circulating fluids are referred to as drilling muds. There are two major types of emulsion drilling fluids or muds, generally identified as oil-in-water emulsions and water-in-oil emulsions, each having its particular requirements, advantages and problems. Water-in-oil emulsions (oil-mud) are preferred in many applications.

These oil-mud circulating fluids are pumped down the drill pipe and out into the wellbore through holes in the drill bit and back up the well in the annular space between the drill pipe and walls of the wellbore, carrying with it drill cuttings and the like that are then removed before recirculation. This mud performs a number of functions, including removing drill cuttings, lubricating and keeping the bit cool, providing flotation to help support the weight of the drill pipe and casing, coating the wellbore surface to prevent caving in and undesirable flow of fluids in or out of the wellbore, including drilling fluids, brine, and the like.

Obviously, the properties of and the composition of these drilling mud formulations are complex and variable, depending on the conditions involved and the results desired to required including reuse and recycling of mud formulations. One of the most important properties of these drilling muds and other drilling fluids is that they be thermally stable and do not present rheological and thixotropic problems under the conditions of drilling.

A major constituent of these oil based drilling muds are colloidal or gelling agents, normally organophilic clays. Large amounts of the clays are often required to obtain the desired thixotropic properties in the mud formulations. It is difficult to readily incorporate these large amounts of clays into formulations. It is an object of this invention to provide improved formulations using less of the clays without loss of the required thixotropic and thermal properties of the oil-mud formulations. It is a further object to provide improved oil-mud formulations not containing clays.

Most organophilic clays will not yield or swell in the low viscosity, low aromatic content mineral seal oils often used in drilling mud formulations. While heat of about 120° to 160° F. will aid in the swelling or activation of the clay particles, most on-site mud mixing facilities do not have the capability of heating the oil during the large volume initial oil-mud makeup. While high shear may also be used to provide heat through frictional forces, to aid the clay particles to swell, most mixing plants do not have high shear equipment, which is expensive initially and in energy requirements and time. Further, because of relatively low yield, higher concentrations of organophilic clays are often required. The excessive amounts required initially cause major problems after hole displacement because of subjection to, and subsequent yield of the organophilic clays, to high downhole temperatures. It is another objective of this invention to maximize the yield of organophilic clay in a short time, at low shear rates, and to obtain savings in both time and materials in oil based mud formulations.

SUMMARY OF THE INVENTION

By the use of small amounts of novel amide resin reaction products of dibasic dimerized or trimerized fatty acids, an alkanolamine and a polyalkylene polyamine, improved drilling mud formulations are obtained. In oil mud drilling formulations containing organophilic clays, one is able to maximize the viscosity and gelation of the formulations, resulting in less preparation time and less material usage, especially the clay. In accordance with the invention, one is able to thicken or gel oil-mud systems at usual operating temperatures even when using low viscosity/low aromatic oils as the external phase, and to maximize the yield of organophilic clays readily in a short period of time, at low shear rates. The amide resin extends the utility of organophilic clays in low viscosity oil-mud systems. They produce more shear thinning fluids, higher yield points and quicker gel strengths while maintaining low plastic viscosities. Oil-mud formulations can be prepared using the amide resin as partial or total replacement for the clays.

DETAILED DESCRIPTION

Organophilic clays have long provided rheology control in oil continuous fluids. Systems using diesel oil as the external phase show substantial variation in performance of organophilic clays, caused by two variables in the diesel oil. The first is that the chemical composition of diesel oil varies widely because of variations in origin and refining of oil. Second, additives to diesel marketed as fuel include corrosion inhibitors and various surfactants. These additives create unpredictable effects upon performance of organophilic clays. Because the needs of the drilling industry for diesel oil are a small segment of the diesel market, additive-free diesel for drilling is not readily available.

Variations in diesel oil have typically been resolved by adding higher concentrations of organophilic clays, up to 25 percent more, to achieve desired yield point and gel structures, but at the expense of disproportionate increase in plastic viscosity, with a resulting decrease in shear thinning properties of the fluid. Performance of organophilic clays is further complicated with the introduction of mineral seal oils wherein the aromatic content was decreased to a level that made organophilic clays almost inoperable, and variability in chemical composition became an unknown to supplier and user. All the new low viscosity oils required much higher concentrations of organophilic clays to develop rheological properties equivalent to those of similar diesel oil system resulting in formulation difficulties.

Organophilic clays do not respond to temperature changes predictably, especially on initial makeup, and for temperatures between ambient and 150° F. Most oil mud rheologies are measured at 115° F. or 150° F. The mud itself may not be exposed to any temperature above ambient until the well site, where it may be exposed to 300°+ F. Typically, the fluid goes into the hole as a relatively thin fluid, the temperature of the hole causes the organophilic clay to further yield with a corresponding increase in viscosity, with a need for dilution resulting.

In an organophilic clay formulation with equivalent yield and gel values at room temperature and after being exposed to high temperature, the variation between ambient and 150° F., the heat aged rheological and thixotropic qualities should be minimal. An organophilic clay that will develop thixotropy and produce non-neutonian fluids at ambient temperatures with a minimum of shear is needed.

Fluids formulated with low viscosity oils should have lower plastic viscosities than similar fluids formulated with diesel oil. Much of this potential advantage is lost when higher concentrations of organophilic clay are required to achieve adequate rheological properties (yield point) and thixotropy (gel strength). Organophilic clays will viscosify low viscosity oils, but they act more as thickeners than thixotropes. They may have yield point and gel strength, but the plastic viscosity is such that shear thinning properties are reduced. It is more difficult to develop gel structure in low viscosity oils than in diesel oil. Yield point develops first and with higher concentrations of organophilic clay, gel strengths can be produced. By the time adequate gels are developed, the fluids will have higher plastic viscosities and yield points than desired. While this is true for both type of oils, the problem is more severe for low viscosity oils.

The introduction of low viscosity mineral seal oil fluids created several problems in application of organophilic clays. First, development of gel strengths in low viscosity oil fluid is much more costly than in diesel oil, especially for rheological properties at relatively low temperatures (below 150° F.). Second, low viscosity oils require higher concentration of organophilic clay. In diesel oil fluids, drilling fluid grade organophilic clays develop viscosities at room temperature. But at room temperature, a low viscosity oil may require two to three times as much viscosifier for the same rheology.

The amide resins of this invention are a new chemical additive designed to improve the performance of all oil-mud formulations, including those containing organophilic clays, in diesel and low viscosity oils LVO. They are designed to produce fluids, formulated with (LVO), with properties equal to or higher than fluids formulated with diesel oil. They are also designed to provide more shear thinning fluids with improved proved thixotropy, especially at lower temperatures. The amide resin additives extend the utility of organophilic clays in low viscosity oil mud systems. They produce a more shear thinning fluid, higher yield points, and quicker gel strengths while maintaining low plastic viscosities. They are true thixotropic additives, not just an oil mud gellant or viscosifier only, and may be used to provide improved formulations not containing a clay.

The novel amide resin additives of this invention are the reaction products of a dibasic dimerized or trimerized fatty acid, a dialkanolamine, and a dialkylene polyamine.

Dibasic acids may be the dimerized fatty acids, commercial products prepared by dimerization of unsaturated fatty acids containing at least 8, preferably about 10 or more to about 18 carbon atoms, including 9-dodecenoic(cis), 9-tetradecenoic(cis), 9-octadecenoic(cis), octadecatetranoic acids, and the like. The typical molecule would contain two carboxyl groups and about 36 carbon atoms in a branched chain configuration. The dibasic trimerized fatty acid may be used which is also a commercial material and similarly prepared, containing about 54 carbon atoms, if at least one of the carboxyl groups is blocked or made inactive by being in the form of an ester group, a salt and the like, i.e., the trimerized fatty acid as used in this invention is a dibasic acid.

Mixtures of dimerized acids and trimerized acids may be used.

The dialkanolamines include hydroxyalkylamines, for example, materials wherein the alkanol groups contain 1 to 6 carbon atoms, preferably 2 to 4 carbon atoms; including for example diethanol amine, di-n-propanol amine, di-i-propanol amine, dibutanol amine, dipentanol amine, dihexanol amine, and the like, and combinations thereof. Preferred are diethanol amine and dipropanol amine. Alkyl hydroxyalkylamines including ethylhydroxyethyl amine, propylhydroxyethyl amine, butylhydroxypropyl amine, and the like can also be used.

The polyalkylene polyamines include materials wherein the alkylene groups contain about 1 to 6 carbon atoms, preferably 2 to 4 carbon atoms; "poly" refers to an integer from about 2 to 20, and at least 3 nitrogen atoms. These materials may be represented by the general formula

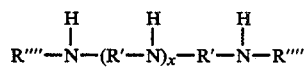

wherein R' is an alkylene group containing 1 to 6 carbon atoms, R'''' is hydrogen or an alkyl group containing 1 to 6 carbon atoms, an x is an integer from 1 to 20. Typical useful materials include diethylene triamine, triethylene tetraamine, tetraethylene pentaamine, polyamine HH, polyamine HPA, and the like. Preferred are diethylene triamine and treithylene tetraamine.

The products of this invention may be represented by the general formula

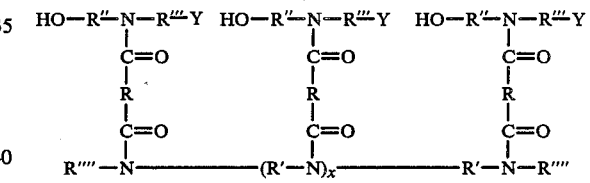

wherein R is an alkylene group containing 20, preferably about 30 to 54 carbon atoms, R' is an alkylene group containing 1 to 6 carbon atoms, R'' is an alkylene group containing 1 to 6 carbon atoms, R''' is an alkylene group containing 1 to 6 carbon atoms, R'''' is a direct bridge, covalent bond, between N and Y or is a hydrogen or alkyl radical containing 1 to 6 carbon atoms, Y is hydrogen or hydroxy, and x is an integer from 1 to 20.

A convenvient method for preparing this follows. In the first reaction a useful ratio of reactants is about 3 moles of dimerized fatty acid and 3 moles of dialkanol amine, heated to eliminate water. In the reaction of 3 moles of dimerized fatty acid with 3 moles of diethanolamine, reacted to a temperature of up to 325° F., the half amide is formed as follows

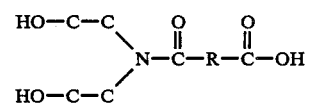

Then about 3 moles of this half reacted dimerized fatty acid is further reacted with about one mole of the polyalkylene polyamine as diethylene triamine through a condensation reaction by heating to eliminate 3 moles of water to form the amide resin.

The general ratio of total reactants used is about 3 moles dimerized fatty acid, about 3 moles of alkanolamine as diethanol amine, and 1 mol polyalkylene polyamine such as diethylene triamine, with a total loss of 6 moles water. The reaction is carried out by first weighing the required amount of dimerized fatty acid and mixing in a calculated amount of diethanol amine to form the hald diethanol amine salt of the dimerized fatty acid. The temperature in increased up to the 335° F. range to form the half amide of diethanol amine by driving off sufficient water, which is determined by weight loss or by measuring the condensed water. The dibasic dimerized or trimerized fatty acid is now functionally a monobasic dimerized or trimerized fatty acid. After cooling to the 225° to 250° F. range, a calculated amount of polyalkylene polyamine, such as diethylene triamine, is next added and mixed to form the half amine salt of polyalkylene polyamine such as diethylene triamine, with the remaining half acid of the dimerized fatty acid. The polyalkylene polyamine such as diethylene triamine, links up with 3 half acid dimers to form a hexamer. Again the temperature is increased up to the 340° F. range to drive off sufficient water to form the other half amides with the polyalkylene polyamine, such as diethylene triamine. The resulting resin product is a hexamer containing 6 amines per molecule.

Two separate amide reactions are preferred to produce as uniform a final amide resin as possible. Several different batches were produced starting with 3 different weights of dimerized fatty acid with constant ratio of reactants. Each time the final product was essentially the same. When stoichiometric amounts of dimerized fatty acid were neutralized with polyalkylene polyamine, such as diethylene triamine alone, the resulting final product was a random mixture that contained a hexamer which was the lowest molecular weight substance as well as other complex substances that could cross-link with much higher molecular weights.

When stoichiometric amounts of dimerized fatty acid and diethanol amine are mixed to form the half amine salt, random neturalization can produce some dineutralized dimers, leave some acid unneutralized, as well as form the half dimer acid salt. However, in the formation of the half amide of diethanol amine, the reaction equilibrium produces a uniform half amide intermediate. Once the half diethanol amide resin is formed, the subsequent addition of polyalkylene polyamine such as diethylene triamine has little complication in linking up these now functionally monobasic dimerized fatty acids to form predominantly the hexamer amide resin. If the total diethanol amine, polyalkylene polyamine such as diethylene triamine and the dimerized fatty acid are reacted in one step, amides are formed as a combined last reaction step. A variable product mixture will result rather than a uniform hexamer amide resin.

It should be noted that because of the nature of the reactants some cross-linking may occur, either in the first stage by ester formation, or in the second stage by amide formation, particularly if the mixture is heated to a high temperature for a long period of time. Some cross-linking is not objectionable and may be of some advantage. But excessive cross-linking is undesirable, resulting in insoluble, not readily dispersible, difficult to handle materials. The man skilled in the art can readily provide the reaction conditions as defined to control cross-linking as desired.

In preparing drilling fluids containing the novel amide resin product, the amide resin product may be added at any stage of preparation at any time to any oil based mud. It is not essential to the practice of the invention that the amide resin product per se be added to the mixture of the drilling fluid ingredients. It may be added to the organophilic clay before the clay is added to the drilling fluid, or it may be added during the preparation of the organophilic clay during reaction of the clay with organic ammonium salts. In any event, to obtain the advantages of the invention, the method of introduction of the amide resin is not critical. It is more efficient to add the amide resin as a drilling fluid ingredient with the other ingredients for use in a variety of formulations.

The amount of amide resin employed, if needed, may vary widely depending on the specific formulation that depend on the type and state of drilling a well at any particular time, depending on, for example, depth, nature of strata, pressure, temperature, etc. An effective amount will be selected by the man skilled in the art. In oil mud formulations where the amide resin is used, the amount used may vary for example from about 0.01, more preferably 0.1, to about 30 ppb. Gellants may not be required in an oil mud system where the water content is high enough to provide adequate properties for suspension of solids. In low weighted oil muds with low aromatic type oils and a high oil/water ratio, the need is greater. For example, larger amounts are normally used in oil muds with densities from about 8.5 to 9 ppg made with LVT oil having an oil/water ratio of 95/5 to 98/2. Smaller amounts would be used if needed in 18 ppg oil muds having an 85/15 or 80/20 oil/water ratio. In formulations containing the organophilic clay, the weight ratio of clay to amide resin may vary for example from about 0.1:10.0 to about 10 to 0.1, In using the amide resin product in drilling mud formulations, the amide resin may be added as such or more preferably in a solution or dispersion. Any of a variety of organic polar solvents may be used, including amines, aldehydes, alcohols, ketones, esters, glycol ethers, carbonates, amides, furans, and the like. Particularly useful are combinations of at least two diverse polar solvents. One useful combination is an alkoxypolyol such as butoxytriglycol and an alkylene carbonate such as propylene carbonate. While the amide resin is not soluble in propylene carbonate, excellent results have been observed with a combination of a major proportion of alkoxypolyol and the alkylene carbonate. For example, a mixture of 90 percent butoxytriglycol and 10 percent propylene carbonate gave excellent results.

The amount of polar solvent used with the amide resin solvent is such that a fluid easily mixed solution or dispersion is obtained. The amount of solvent will vary, depending on its effectiveness in reducing the viscosity of the amide resin, as may be readily determined by those skilled in the art. In using butoxytriglycol and propylene carbonate mixtures, 50 weight percent of the amide resin produce dissolved in 50 weight percent of the solvent mixture was found to be very satisfactory.

Oil base drilling muds are prepared in a great variety of formulations and with a large number of ingredients, as is well known to those skilled in the art. Specific formulations depend on the state of drilling a well at any particular time for instance, depending on the depth, the nature of the strata encountered, and the like. The compositions of this invention are directed to and are directed to and are particularly adapted to provide improved oil base drilling muds useful under conditions of high temperature and pressure, such as those encountered in deep wells, where many previously proposed and used formulations do not heat age well in operations under such high temperature and high pressure conditions.

Oil base mud formulations intended for use under high temperature (up to about 500° F.) and high pressure (up to about 25,000 psi) conditions may contain a petroleum oil, a weighting agent, an emulsifier, a gelling or thixotropic agent, salts and a fluid loss control agent as the ingredients if desired. Water is often added by it may be introduced from the formations themselves during drilling.

The oil (continuous phase) used is a petroleum oil, generally diesel oil or mineral seal oil, although lighter oils such as kerosene, or heavier oils such as fuel oil, white oil, crude oil, and the like may also be used. The invention is particularly useful with low viscosity, low aromatic oils, No. 2 diesel oil and mineral seal oils.

If water is used, the amount normally is small, and while usually is less than about 10 weight percent, amounts as high as about 60 volume percent may be present under some conditions.

Emulsifiers, both invert and wetting agents, include those normally used, including alkali and alkaline earth metal salts of fatty acids, rosin acids, tall oil acids, the synthetic emulsifiers such as alkyl aromatic sulfonates, aromatic alkyl sulfonates, long chain sulfates, oxidized tall oilts, carboxylated-2-alkyl imidazolines, imidazoline salts, amido amines, alkoxy phenols, polyalkoxy alcohols, alkyl phenols, high molecular weight alcohols, and the like.

Water soluble salts often added to the formulations normally are the brine salts such as sodium chloride, potassium chloride, sodium bromide, calcium chloride, more preferably, and the like, usually in a water solution. Formation brines and seawater may be used. These salts are added to control the osmotic pressure of the formulations as needed, according to drilling conditions.

Weighting materials, if used, include such materials as calcium carbonate, silicates, clays, and the like, but more preferably are the heavier materials such as the barites, specular hematite, iron ores, siderite, ilmenite, galena, and the like.

The oil-muds normally will be formulated to weight from greater than about 7 (no weighting agent) to about 22 pounds per gallon of mud. Usually the range is from about 10 to 18 pounds per gallon. The water content will normally be from 0 to 60 percent by volume.

The thixotropic thickening and gelling agents used in many oil-mud formulations are organophilic clays. The clays used may be any of those that have substantial base-exchange capacity. A variety of such materials are known to those skilled in the art, including Wyoming bentonite, montmorillonite, hectorite, attapulgite, illite, fullers earth, beidillite, saponite, vermiculite, zeolites, and the like. Wyoming swelling bentonite and hectorite are normally utilized. While the amide resins of this invention are especially effective when used with these clays, they also enhance the gel strength of formulations not containing clay.

To obtain the desired organophilic clays, the swelling bentonites and hectorites are reacted with functional organic compounds, as is well known to those skilled in the art. The amount of organic compound used will be dependent on the reactivity of the clays used, but usually is from about 50 to 300 milliequivalents of an organic ammonium salt, for example, per 100 grams of clay. The reactions are normally conducted in water and the treated clay is separated and dried. Normally used are onium compounds, as organic ammonium salts such as quaternary ammonium salts having the structural formula

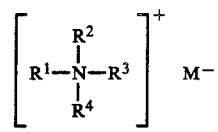

wherein $R^1$ are alkyl groups containing 1 to 20 carbon atoms; $R^2$ are alkyl groups containing 1 to 20 carbon atoms; $R^3$ are alkyl groups containing 1 to 20 carbon atoms; $R^4$ are alkyl groups containing 1 to 20 carbon atoms; and at least one of $R^1$, $R^2$, $R^3$ or $R^4$ contains at least 12 carbon atoms, and M is Cl, Br, I, OH or $SO_4$. Typical reactants include those containing quaternary ammonium cations selected from the group consisting of trimethyl octadecyl ammonium, dimethyl dihydrogenated tallow ammonium, methyl benzyl dicoco ammonium, methyl trihydrogenated tallow ammonium, methyl benzyl dihydrogenated tallow ammonium chloride, and the like. Descriptions of preparation of typical organophilic clays can be found in U.S. Pat. Nos. 2,966,506; 4,105,578; 4,382,868; and 4,425,244.

The organophilic clay content of the oil-mud formulation will vary inversely as the density of the oil-mud. The organophilic clay content may range from about 25 to 30 pounds per barrel (ppg) in low densities, to almost 0 in high densities. Normally an amount from about 2 to about 15 pounds of clay per barrel of mud will be used. The degree of suspension or hole cleaning required or requested will have an impact on the clay concentration as is well known to those skilled in the art.

The amide resin used in the following Example was prepared by reacting 3 moles of UNIDYME 14 dimerized acid, a tall oil derivative (96% dimerized acid of $C_{18}$ unsaturated acids, 3% trimerized acid, 1% monomer, 195 acid number and 200 saponification number, specific gravity 0.95 at 25° C.), with 3 moles of diethanolamine (DEA) by heating the mixture up to 335° F. to form the half amide of DEA. The half reacted diethanol amine product of the dimerized fatty acid was then cooled to 225° to 250° F., 1 mole of diethylene triamine was added to the 3 moles of the half unreacted dimerized fatty acid and the temperature was increased up to 340° F. to form the amide resin hexaminer resin. Fifty weight parts of the hexamer resin was dissolved in 45 weight parts of butoxytriglycol and 5 weight parts of propylene carbonate. This solution is referred to for convenience as AR.

The organophilic clay used in the Examples was a commercial clay prepared by reacting a Wyoming swelling bentonite clay (smectite) in water with about 50 milliequivalents per 100 grams of clay of dimethyl dihydrogenated tallow ammonium chloride, separating the clay and drying.

In the following Examples, a 9 pound and a 12 pound per gallon drilling fluid using low viscosity oil were prepared according to the following recipe:

| Ingredients | 9 pound Mud | 12 pound Mud |
|---|---|---|
| Low viscosity oil | 233.1 cc | 219.2 cc |

| Ingredients | 9 pound Mud | 12 pound Mud |
| --- | --- | --- |
| (Conoco LVTO) | | |
| Organophilic clay | 15.0 grams | 12.0 grams |
| MAGCO DFL[1] | 4.0 grams | 4.0 grams |
| MAGCO DWA[2] | 2.0 grams | 2.0 grams |
| Lime | 4.0 grams | 4.0 grams |
| Water | 77.0 cc | 49.4 cc |
| 77% Calcium chloride | 33.6 grams | 23.7 grams |
| Barite | 62.9 grams | 233.5 grams |
| Oil-water ratio | 75:25 O/W | 80:20 O/W |

[1]Amidoamine water-in-oil emulsifier
[2]Oxidized tall oil wetting additive

The following specific Examples demonstrate the practice and advantages of the invention. The plastic viscosity, yield point and gel strengths were determined with a Fann Viscometer. The yield point is reported in terms of pounds per 100 square feet, the plastic viscosity in centipoises (cps), and gel strength as pounds per 100 square feet.

EXAMPLE I

A typical low viscosity oil-mud formulation, 9 pounds per gallon, was prepared as described above. This formulation required the addition of 15 pounds of organophilic clay per barrel of formulation to obtain a fluid having adequate rheological properties for use as a drilling fluid. 20 weight percent of the clay was replaced with the AR in one embodiment, and in a second embodiment, the amount of clay added was 9 pounds with 3 pounds of AR. The plastic viscosity (PV), yield point (YP), 10 second gel (10') and 10 minute gel (10") were determined and are set forth in Table I.

TABLE I

| | PV | YP | 10' GEL | 10" GEL |
| --- | --- | --- | --- | --- |
| Mud + 15 #/bbl Clay | 29 | 15 | 8 | 11 |
| Mud + 12# Clay + 3# AR | 27 | 48 | 37 | 38 |
| Mud + 9# Clay + 3# AR | 26 | 28 | 25 | 30 |

By replacing 20 percent of the clay with the AR, the plastic viscosity remained about constant, while the yield point and gel strengths were substantially increased so that the drilling fluid is greatly improved and is a more useful and versatile material.

EXAMPLE II

The organophilic clays are used in drilling fluids to develop yield point and gel strength in continuously used fluids. It is desirable that this be done with a minimum effect on the plastic viscosity. A series of formulations based on a 12 pound per gallon low viscosity oil-mud fluid were prepared using increasing amounts of organophilic clay and as a comparison, amounts of the organophilic clay and AR required to obtain the same yield point. These data are found in Table II.

TABLE II

| For Yield Point Of: | #/BBL Clay | #/BBL Clay/AR |
| --- | --- | --- |
| 3 | 14 | 3.33/1.66 |
| 5 | 16 | 4/2 |
| 7 | 18 | 5/2.5 |
| 14 | 20 | 6.8/3.4 |
| 20 | 22 | 7.7/3.7 |
| 31 | 24 | 8.9/4.5 |

In each case from ⅓ to ½ as much of the mixture of organophilic clay and AR provided the same yield point as the substantially larger amounts of organophilic clay used alone. This contributes to easier preparation and a less expensive drilling fluid, because of use of less clay and less time and energy required to prepare the formulations than those containing the larger amounts of organophilic clay.

By using the AR in the formulations, there is obtained a significant difference in the plastic viscosity and gel strengths (10 second) of the drilling fluids described in Table II, prepared with the clay/AR combination as compared to those made with the organophilic clay alone. These data are set forth in Table III.

TABLE III

| For Yield Point Of: | Organophilic Clay | | Organophilic Clay/AR | |
| --- | --- | --- | --- | --- |
| | Pl. Vis. | 10' Gel | Pl. Vis. | 10' Gel |
| 3 | 31 | 2 | 17 | 2 |
| 5 | 34 | 3 | 19 | 4 |
| 7 | 41 | 3 | 21 | 6 |
| 14 | 50 | 5 | 24 | 10 |
| 20 | 54 | 6 | 26 | 16 |
| 31 | 63 | 8 | 29 | 24 |

The lower the plastic viscosity for an equivalent yield point, the more useful the drilling fluid. The lower viscosities for the drilling fluids containing the clay/AR combination are evident from this table. Enhanced gel strengths of the fluids containing the clay/AR combination are also shown.

EXAMPLE III

The AR may be added to the drilling fluid formulation as a separate and independent additive. It can be premixed with the organophilic clay, or it can be used as a raw material in combination with the quaternary ammonium salt in the manufacture of the organophilic clay. In this Example, 5 weight percent, based upon the weight of the finished product, of AR was mixed with the quaternary ammonium salt and this mixture added to the bentonite to produce an improved organophilic clay. A low viscosity oil (CONOCO LVT) oil-mud formulation, weighing 12 pounds per gallon, was mixed (1) with 12 pounds per barrel of a commercial organophilic clay and (2) 12 pounds per barrel of the AR modified organophilic clay. The properties of the twp formulations are set forth in Table IV.

TABLE IV

| | | YP | 10' Gel | 10" Gel |
| --- | --- | --- | --- | --- |
| (1) | Commercial Organophilic clay | −2 | 2 | 2 |
| (2) | AR Treated Organophilic clay | 19 | 13 | 25 |

The advantages and greatly improved drilling fluid are obvious from the improved yield points and gel strengths obtained with the organophilic clay containing the AR as compared to formulations containing the clay without the AR.

EXAMPLE IV 12.0 pound muds were prepared with (1) No. 2 Diesel Oil and (2) LVT oil, according to the following formulation: 250.0 cc of oil, 8.3 (5 ppb) grams of a mixture of 60% AR—1 and 40% isopropyl alcohol, 3.0 grams of Magco DFL, 3.0 grams of Magco DWA, 3.0 grams of lime, 27.2 cc of water, 9.9 grams of 95% calcium chloride, 228.0 grams of barite. The oil/water ratio was 90:10 o/w. In the diesel formulation, at 75° F., PV was 39, YP was 16, 10′ was 8, and 10″ was 12. At 150° F. the PV was 21, YP was 8, 10′ was 7, and 10″ was 10. With the LVT formulation, at 75° F., PV was 30, YP was 11, 10′ was 6, and 10″ was 10. At 150° F., PV was 16, YP was 7, 10′ was 6, and 10″ was 9.

The novel amide resins of this invention are particularly useful in improving the properties of oil-mud formulations using low viscosity/low aromatic content oils. For example, in formulations using diesel oil, 9.5 pounds per barrel of organophilic clay may be required to provide a yield point of 15, but the same formulation, using a low viscosity oil, would require 21 pounds per barrel of organophilic clay to obtain the same yield point. A more serious problem with low viscosity oils is that such formulations develop gel strengths at a slower rate than they develop yield points. The rate at which gel strengths can be developed in low viscosity oils is about 1/5 that possible for diesel oils. In other words, in the formulations described, if a 15 gel strength is required, in a low viscosity oil, 40 pounds per barrel of organophilic clay could be required, but before that concentration could be achieved, the fluid would become too difficult to pump.

The amide resins of this invention can be used to improve the low temperature performance of organophilic clays, work additively or synergistically, depending on concentration, with the clays to produce higher yield points and quicker gel strength development, while at the same time maintaining low plastic viscosities with produces a more shear thinning fluid. While these advantages are particularly valuable in applications where low viscosity oils are used, the amide resins are useful with and improve the performance of oil-muds containing any hydrocarbon oil, including diesel oils, mineral seal oils, and the like. In addition to improved shear thinning properties, there is also the improvement in thixotropic properties obtained when the defined amide resins are employed. Also important is the reduced temperature dependence of formulations containing the amide resins. To develop optimum rheological properties initially and also to have satisfactory aged properties a ratio of about 2:1 of clay to AR may be used. If higher rheology is not required initially, a 4:1 ratio would be preferred. Lower or higher ratios may be used, depending on the particular requirements of the drilling fluid environment.

We claim:

1. An amide resin having the formula

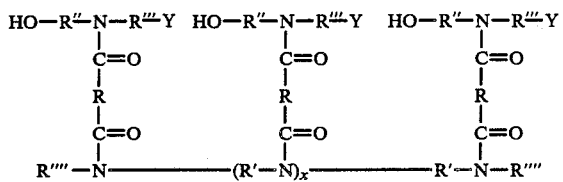

wherein R is an alkylene group containing 20 to 54 carbon atoms, R′ and R″ are alkylene groups containing 1 to 6 carbon atoms, R‴ is a bond between N and Y or R‴ presents an alkylene group containing 1 to 6 carbon atoms, R″″ is hydrogen or alkyl radicals containing 1 to 6 carbon atoms, Y is hydroxy, and x is an integer from 1 to 20.

2. An amide resin of claim 1 wherein R contains 36 carbon atoms, R″ and R‴ contain 2 to 3 carbon atoms, R′ contains 2 carbon atoms, and R″″ is hydrogen.

3. An amide resin of claim 2 wherein R″ and R‴ contain 2 carbon atoms.

4. An amide resin of claim 1 wherein R is the alkylene residue of dibasic dimerized or trimerized fatty acids containing 36 to 54 carbon toms, R″ and R‴ are the alkylene residues of dialkanolamines containing 1 to 6 carbon atoms, and R′ is the alkylene residue of a polyalkylamine containing 1 to 6 carbon atoms.

5. An amide resin of claim 4 wherein R is derived from a dimerized fatty acid, R″ and R‴ are derived from diethanol or dipropanol amine, and R′ is derived from a polyethylene polyamine containing at least 3 nitrogen atoms.

6. An amide resin of claim 5 wherein the polyalkylene polyamine is diethylene triamine.

7. An amide resin of claim 5 wherein the polyalkylene polyamine is triethylene tetraamine.

8. An amide resin of claim 5 wherein the polyalkylene polyamine is tetraethylene pentaamine.

9. An amide resin of claim 5 wherein the polyalkylene polyamine is pentaethylene hexamine.

10. An amide resin having the formula

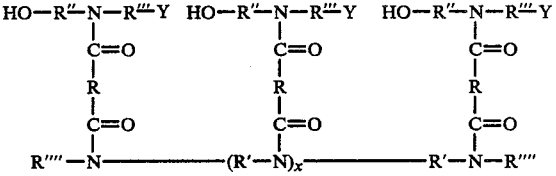

wherein R is an alkylene group containing 20 to 54 carbon atoms, R′ and R″ are alkylene groups containing 1 to 6 carbon atoms, R‴ is a bond between N and Y or R‴ represents an alkylene group containing 1 to 6 carbon atoms, R″″ is hydrogen or alkyl radicals containing 1 to 6 carbon atoms, Y is hydrogen or hydroxy, and x is an integer from 1 to 20.

* * * * *

UNITED STATES PATENT AND TRADEMARK OFFICE
CERTIFICATE OF CORRECTION

PATENT NO. : 4,816,551

DATED : March 28, 1989

INVENTOR(S) : Harris A. Oehler, Henry C. McLaurine, Charles K. Grantham

It is certified that error appears in the above-identified patent and that said Letters Patent is hereby corrected as shown below:

Column 5, line 8, change "hald" to --half--

Column 7, line 46, change "weight" to --weigh--

Column 10, line 44, change "twp" to --two--

Column 11, line 36, change "with" to --which--

Column 12, line 13, change "presents" to --represents--

Column 12, line 24, change "tams" to --atoms--

Signed and Sealed this

Second Day of January, 1990

Attest:

JEFFREY M. SAMUELS

*Attesting Officer*   *Acting Commissioner of Patents and Trademarks*